US009800792B2

(12) United States Patent
Sugawara

(10) Patent No.: US 9,800,792 B2
(45) Date of Patent: Oct. 24, 2017

(54) IMAGE PICKUP APPARATUS CAPABLE OF DETERMINING LIGHT AMOUNT CHANGE CHARACTERISTIC, METHOD OF DETERMINING LIGHT AMOUNT CHANGE CHARACTERISTIC, AND STORAGE MEDIUM

(71) Applicant: CANON KABUSHIKI KAISHA, Tokyo (JP)

(72) Inventor: Atsushi Sugawara, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/181,654

(22) Filed: Jun. 14, 2016

(65) Prior Publication Data

US 2016/0373632 A1 Dec. 22, 2016

(30) Foreign Application Priority Data

Jun. 17, 2015 (JP) ................................. 2015-121911

(51) Int. Cl.
*H04N 5/376* (2011.01)
*H04N 5/378* (2011.01)
*H04N 5/235* (2006.01)

(52) U.S. Cl.
CPC ........... *H04N 5/2351* (2013.01); *H04N 5/378* (2013.01); *H04N 5/3765* (2013.01); *H04N 5/2357* (2013.01)

(58) Field of Classification Search
CPC .... H04N 5/2351; H04N 5/378; H04N 5/3765; H04N 5/23229; H04N 5/23254; H04N 5/23293; H04N 19/00; G06K 9/32
See application file for complete search history.

(56) References Cited

U.S. PATENT DOCUMENTS

| 8,210,681 | B2* | 7/2012 | Flanagan | A61B 3/0091 351/200 |
| 8,218,029 | B2* | 7/2012 | Nagai | H04N 5/235 348/226.1 |
| 8,294,784 | B2* | 10/2012 | Schatvet | H04N 5/2357 348/226.1 |
| 8,330,829 | B2* | 12/2012 | Goh | H04N 5/2357 348/226.1 |

(Continued)

FOREIGN PATENT DOCUMENTS

JP 2012-120132 A 6/2012

*Primary Examiner* — Hung Lam
(74) *Attorney, Agent, or Firm* — Carter, DeLuca, Farrell & Schmidt, LLP

(57) ABSTRACT

An image pickup apparatus capable of determining a light amount change characteristic at the time of photographing with high accuracy. A light amount change period of light from a photometric target is determined, based first and second evaluation values calculated, respectively, based on a predetermined photometric value, and each of photometric values at first and second intervals causing the photometric values to be in the same phase relationship and the opposite phase relationship with the predetermined photometric value, respectively, in a case where the light from the photometric target changes at a predetermined frequency. It is determined whether or not the light from the photometric target changes at a light amount change period corresponding to the predetermined frequency.

17 Claims, 9 Drawing Sheets

(56) References Cited

U.S. PATENT DOCUMENTS

| | | | | |
|---|---|---|---|---|
| 8,711,245 B2* | 4/2014 | Kinrot | ............... | H04N 5/2357 |
| | | | | 348/226.1 |
| 2009/0147103 A1* | 6/2009 | Chao | ................. | H04N 5/2351 |
| | | | | 348/226.1 |
| 2010/0171875 A1* | 7/2010 | Yamamoto | ............ | G03B 15/03 |
| | | | | 348/370 |

* cited by examiner

|  | | 100 Hz FLICKERING ENVIRONMENT? | |
|---|---|---|---|
|  | | YES | NO |
| 120 Hz FLICKERING ENVIRONMENT? | YES | DC | 120 Hz |
|  | NO | 100 Hz | DC |

IMAGE PICKUP APPARATUS CAPABLE OF DETERMINING LIGHT AMOUNT CHANGE CHARACTERISTIC, METHOD OF DETERMINING LIGHT AMOUNT CHANGE CHARACTERISTIC, AND STORAGE MEDIUM

BACKGROUND OF THE INVENTION

Field of the Invention

The present invention relates to an image pickup apparatus including an image pickup device, a method of determining a light amount change characteristic at the time of photographing, and a storage medium.

Description of the Related Art

In recent years, image pickup apparatuses, such as a digital camera, have come to be equipped with an image pickup device improved in sensitivity. This has made it possible to photograph a picture without blurring at a high shutter speed even under a relatively dark environment, such as indoors. However, fluorescent lamps, which are widely used as indoor light sources, produce a phenomenon called flicker in which illumination light periodically fluctuates due to influence of the frequency of a power supply (in general, a commercial power supply). When image pickup is performed at high shutter speed under such a light source that produces flicker (hereinafter referred to as the "flickering light source"), exposure unevenness or color temperature variation of an image can be caused between frames due to the influence of flickering, and further, exposure unevenness and/or color unevenness sometimes occur(s) within one frame.

To solve this problem, there has been proposed a technique for detecting a state of flicker of illumination light, and adjusting the timing of image pickup such that the center of an exposure time substantially coincides with timing in which the light amount of the illumination light indicates a maximum value. For example, in a technique described in Japanese Patent Laid-Open Publication No. 2012-120132, to detect flicker and its frequency, first, a plurality of images are acquired (photographed) at a high-speed frame rate not lower than 600 fps, and a luminance evaluation value is obtained from each frame image. Then, temporal changes in the luminance evaluation value are subjected to binarization processing, and if an interval of the timing in which the luminance evaluation value after binarization processing rises from 0 to 1 is 10 ms (milliseconds), it is determined that 100 Hz flicker is caused, and if the interval is 8.4 ms, it is determined that 120 Hz flicker is caused.

The technique disclosed in Japanese Patent Laid-Open Publication No. 2012-120132 is useful in a case where the light amount of flicker ideally changes along a sine curve. However, in a case where the light amount of flicker irregularly changes e.g. due to the characteristics of a power source or a lighting (illumination) device, there is a possibility that it is impossible to correctly determine occurrence of flicker and its frequency.

SUMMARY OF THE INVENTION

The present invention provides an image pickup apparatus that is capable of determining a light amount change characteristic at the time of photographing with high accuracy, a method of determining a light amount change characteristic, and a storage medium.

In a first aspect of the invention, there is provided an image pickup apparatus comprising a photometry unit, a first calculation unit configured to calculate a first evaluation value, based on a predetermined photometric value and a photometric value at a first interval from the predetermined photometric value, out of a plurality of photometric values acquired by periodically performing photometry at fixed time intervals using the photometry unit, a second calculation unit configured to calculate a second evaluation value, based on the predetermined photometric value and a photometric value at a second interval from the predetermined photometric value, out of the plurality of photometric values, and a determination unit configured to determine a light amount change period of light from a photometric target, based on the first evaluation value and the second evaluation value, wherein the determination unit determines whether or not the light from the photometric target changes at a light amount change period corresponding to a first frequency, wherein the first interval is an interval which causes the photometric value at the first interval to be in the same phase relationship with the predetermined photometric value in a case where the light from the photometric target changes at the first frequency, and wherein the second interval is an interval which causes the photometric value at the second interval to be in an opposite phase relationship with the predetermined photometric value in a case where the light from the photometric target changes at the first frequency.

In a second aspect of the invention, there is provided an image pickup apparatus comprising a photometry unit configured to acquire a plurality of photometric values by periodically performing photometry at fixed time intervals, a first calculation unit configured to calculate a first evaluation value, based on a predetermined photometric value and a photometric value at a first interval from the predetermined photometric value, out of the plurality of photometric values, a second calculation unit configured to calculate a second evaluation value, based on the predetermined photometric value and a photometric value at a second interval from the predetermined photometric value, out of the plurality of photometric values, a third calculation unit configured to calculate a third evaluation value, based on the predetermined photometric value and a photometric value at a third interval from the predetermined photometric value, out of the plurality of photometric values, and a determination unit configured to determine, based on the first evaluation value, the second evaluation value, and the third evaluation value, a period at which light from a photometric target on which photometry is performed by the photometry unit changes, wherein the determination unit determines whether the light from the photometric target changes at a light amount change period corresponding to a first frequency or at a light amount change period corresponding to a second frequency which is different from the first frequency.

In a third aspect of the invention, there is provided a method of determining a light amount change characteristic at the time of photographing performed by an image pickup apparatus including a photometry unit, comprising acquiring a plurality of photometric values by periodically performing photometry at fixed time intervals using the photometry unit, calculating a first evaluation value, based on a predetermined photometric value, and a photometric value at a first interval which causes the photometric value at the first interval to be in the same phase relationship with the predetermined photometric value in a case where light from a photometric target changes at a first frequency, out of the plurality of photometric values, calculating a second evaluation value, based on the predetermined photometric value, and a photometric value at a second interval which causes the photometric value at the second interval to be in an opposite phase relationship with the predetermined photometric value in a case where the light from the photometric target changes at the first frequency, and determining a light amount change period of the light from the photometric target, based on the first evaluation value and the second evaluation value, to thereby determine whether or not the light from the photometric target changes at a light amount change period corresponding to the first frequency.

In a fourth aspect of the invention, there is provided a method of determining a light amount change characteristic at the time of photographing performed by an image pickup apparatus including a photometry unit, comprising acquiring a plurality of photometric values by periodically performing photometry at fixed time intervals, calculating a first evaluation value, based on a predetermined photometric value and a photometric value at a first interval from the predetermined photometric value, out of the plurality of photometric values, calculating a second evaluation value, based on the predetermined photometric value and a photometric value at a second interval from the predetermined photometric value, out of the plurality of photometric values, calculating a third evaluation value, based on the predetermined photometric value and a photometric value at a third interval from the predetermined photometric value, out of the plurality of photometric values, and determining, based on the first evaluation value, the second evaluation value, and the third evaluation value, a period at which light from a photometric target on which photometry is performed by the photometry unit changes, to thereby determine whether the light from the photometric target changes at a light amount change period corresponding to a first frequency or at a light amount change period corresponding to a second frequency which is different from the first frequency.

In a fifth aspect of the invention, there is provided a non-transitory computer-readable storage medium storing a computer-executable program for causing a computer to execute a method of determining a light amount change characteristic at the time of photographing performed by an image pickup apparatus including a photometry unit, wherein the method comprises acquiring a plurality of photometric values by periodically performing photometry at fixed time intervals using the photometry unit, calculating a first evaluation value, based on a predetermined photometric value, and a photometric value at a first interval which causes the photometric value at the first interval to be in the same phase relationship with the predetermined photometric value in a case where light from a photometric target changes at a first frequency, out of the plurality of photometric values, calculating a second evaluation value, based on the predetermined photometric value, and a photometric value at a second interval which causes the photometric value at the second interval to be in an opposite phase relationship with the predetermined photometric value in a case where the light from the photometric target changes at the first frequency, and determining a light amount change period of the light from the photometric target, based on the first evaluation value and the second evaluation value, to thereby determine whether or not the light from the photometric target changes at a light amount change period corresponding to the first frequency.

In a sixth aspect of the invention, there is provided a non-transitory computer-readable storage medium storing a computer-executable program for causing a computer to execute a method of determining a light amount change characteristic at the time of photographing performed by an image pickup apparatus including a photometry unit, wherein the method comprises acquiring a plurality of photometric values by periodically performing photometry at fixed time intervals, calculating a first evaluation value, based on a predetermined photometric value and a photometric value at a first interval from the predetermined photometric value, out of the plurality of photometric values, calculating a second evaluation value, based on the predetermined photometric value and a photometric value at a second interval from the predetermined photometric value, out of the plurality of photometric values, calculating a third evaluation value, based on the predetermined photometric value and a photometric value at a third interval from the predetermined photometric value, out of the plurality of photometric values, and determining, based on the first evaluation value, the second evaluation value, and the third evaluation value, a period at which light from a photometric target on which photometry is performed by the photometry unit changes, to thereby determine whether the light from the photometric target changes at a light amount change period corresponding to a first frequency or at a light amount change period corresponding to a second frequency which is different from the first frequency.

According to the present invention, it is possible to determine a light amount change characteristic at the time of photographing with high accuracy.

Further features of the present invention will become apparent from the following description of exemplary embodiments (with reference to the attached drawings).

DESCRIPTION OF THE EMBODIMENTS

The present invention will now be described in detail below with reference to the accompanying drawings showing embodiments thereof. Here, as an image pickup apparatus according to the present invention, a so-called digital camera is described by way of example. However, this is not limitative, but the present invention may be applied to various electronic apparatuses having a camera function. For example, the image pickup apparatus according to the present invention may be, for example, a mobile communication terminal which is equipped with the camera function, such as a mobile phone or a smartphone, a portable-type computer equipped with the camera function, and a portable video game machine equipped with the camera function.

Figure 1:
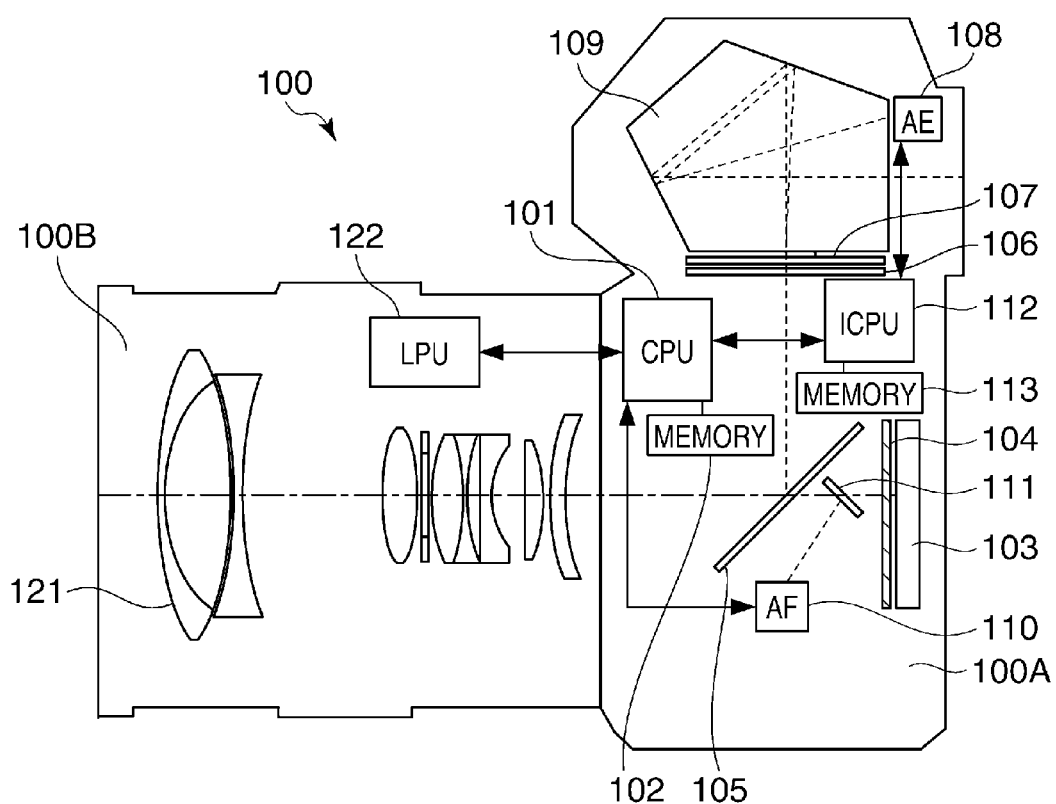
FIG. 1 is a schematic view of a digital camera as an image pickup apparatus according to the present invention.

FIG. 1 is a schematic view of a digital camera 100 as the image pickup apparatus according to the present invention. Note that one or more of function blocks appearing in FIG. 1 may be realized by hardware, such as an application specific integrated circuit (ASIC) or a programmable logic array (PLA), or may be realized by a programmable processor, such as a CPU or an MPU, that executes software. Further, one or more of function blocks may be realized by combining software and hardware. Therefore, in the following description, even in a case where different processing operations are described to be executed by respective different function blocks, the execution of the different processing operations can be realized by the same hardware unit.

The digital camera 100 is generally comprised of a camera body 100A and a lens barrel 100B. The lens barrel 100B, which is an image pickup optical system, may be provided integrally with the camera body 100A, or may be provided removably from the camera body 100A. In the following description, calculation of a light amount change characteristic of light from a photographing target (ambient light at the time of photographing) is referred to as "flicker detection".

The camera body 100A includes a CPU 101, a memory 102, an image pickup device 103, a shutter 104, a half mirror 105, a focusing plate 106, a display device 107, and a photometric (AE) sensor 108. Further, the camera body 100A includes a pentaprism 109, an optical finder, not shown, an AF sensor 110, an AF mirror 111, an ICPU 112, and a memory 113. The lens barrel 100B includes a plurality of lenses 121, a diaphragm, not shown, and an LPU 122.

The CPU 101 is a processing unit that controls the components of the digital camera 100. The memory 102 includes a ROM storing programs executed by the CPU 101, variables, etc., and a RAM having a work area into which the CPU 101 loads programs and a storage area for temporarily storing image data etc. The LPU 122 is a CPU provided in the lens barrel, which transmits e.g. distance information indicative of a distance from an object to the CPU 101, and further, performs driving control of the lenses 121, and so forth, based on commands from the CPU 101. The image pickup device 103 is an image sensor comprised of a photoelectric conversion device, such as a CMOS image sensor, including an infrared cut filter, a low-pass filter, and so forth. The shutter 104 is closed to shield the image pickup device 103 from light when photographing is not performed, and is opened to guide incident light (light flux) having passed through the lens barrel 100B to the image pickup device 103 when photographing is performed.

The half mirror 105 disposed on a front side (photographing target side) of the image pickup device 103 reflects part of light incident through the lenses 121 when photographing is not performed to thereby cause an optical image (object image) to be formed on the focusing plate 106. The display device 107 displays an AF ranging frame e.g. of a PN (polymer network) liquid crystal, to thereby indicate a point of an object for which AF control is performed, to a photographer (user) through the optical finder. The photometric sensor 108 is formed by a photoelectric conversion device, such as a CCD sensor or a CMOS sensor, and performs photometry on a photometric target (field) for exposure control to thereby measure the brightness (luminance) of the photometric target. Note that although a photometric target is generally an object which is a photographing target, a light source can also be set as a photometric target. The following description is given assuming that the photometric target is a photographing target.

The pentaprism 109 guides the object image formed on the focusing plate 106 to the photometric sensor 108 and the optical finder. Note that the photometric sensor 108 views the object image formed on the focusing plate 106 from an oblique position through the pentaprism 109. The AF mirror 111 guides part of a light flux which has entered through the lens barrel 100B and has passed the half mirror 105, to the AF sensor 110. The AF sensor 110 measures a distance for automatic focusing with respect to the object based on the received light flux.

The ICPU 112 is a CPU that controls the driving of the photometric sensor 108, and performs various arithmetic processing operations, such as photometric calculation, object recognition processing including face detection calculation and tracking calculation, and flicker detection calculation. The memory 113 includes a ROM storing programs executed by the ICPU 112, variables, and so forth, and a RAM having a work area into which the ICPU 112 loads programs and a storage area for temporarily storing calculation results.

Although not shown in FIG. 1, the digital camera 100 includes a power switch and a shutter switch. The shutter switch includes a switch SW1 which is turned on by half-pressing thereof (first stroke) and a switch SW2 which is turned on by full-pressing thereof (second stroke). When the switch SW1 is turned on, exposure control based on an output from the photometric sensor 108 and automatic focusing control based on an output from the AF sensor 110 are performed. Further, when the switch SW2 is turned on, actual photographing is performed. In the actual photographing, an optical image formed on the image pickup device 103 is converted to analog electric signals by the image pickup device 103, and the analog electric signals are converted to digital image data by an image processor, not shown, which is stored in a storage section, such as a memory card, not shown.

Figure 2:
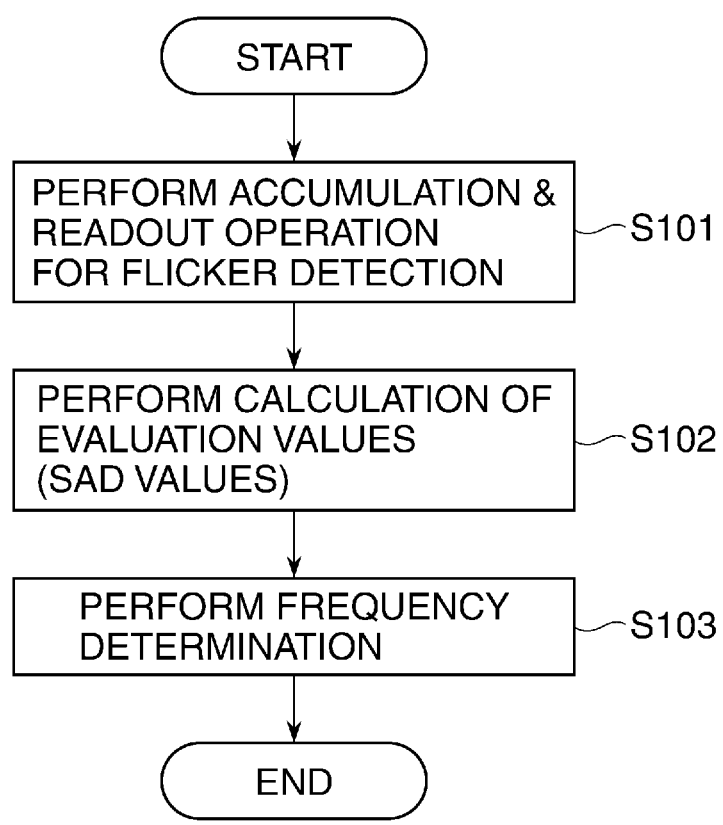
FIG. 2 is a flowchart of a light amount change period determination process performed by the digital camera shown in FIG. 1 based on a flicker determination method according to a first embodiment of the present invention.

FIG. 2 is a flowchart of a light amount change period determination process performed by the digital camera 100 based on a flicker determination method according to a first embodiment, for determining a light amount change period (period at which the light amount repeatedly changes). The processing steps in FIG. 2 are realized by the CPU 101 that controls the operations of the components of the digital camera 100 by loading programs stored in the ROM of the memory 102 into the RAM and executing the same. In a step S101, the CPU 101 causes the photometric sensor 108 to perform charge accumulation (hereinafter simply referred to as "accumulation") and readout of accumulated charges (hereinafter simply referred to as "readout") for flicker detection. Note that although in the present embodiment, the CPU 101 controls the operations of the camera 100 by loading programs stored in the ROM of the memory 102 into the RAM and executing the same, the operations of the camera 100 may be controlled by the components of the digital camera 100 that operate in cooperation with each other.

Figure 3A:
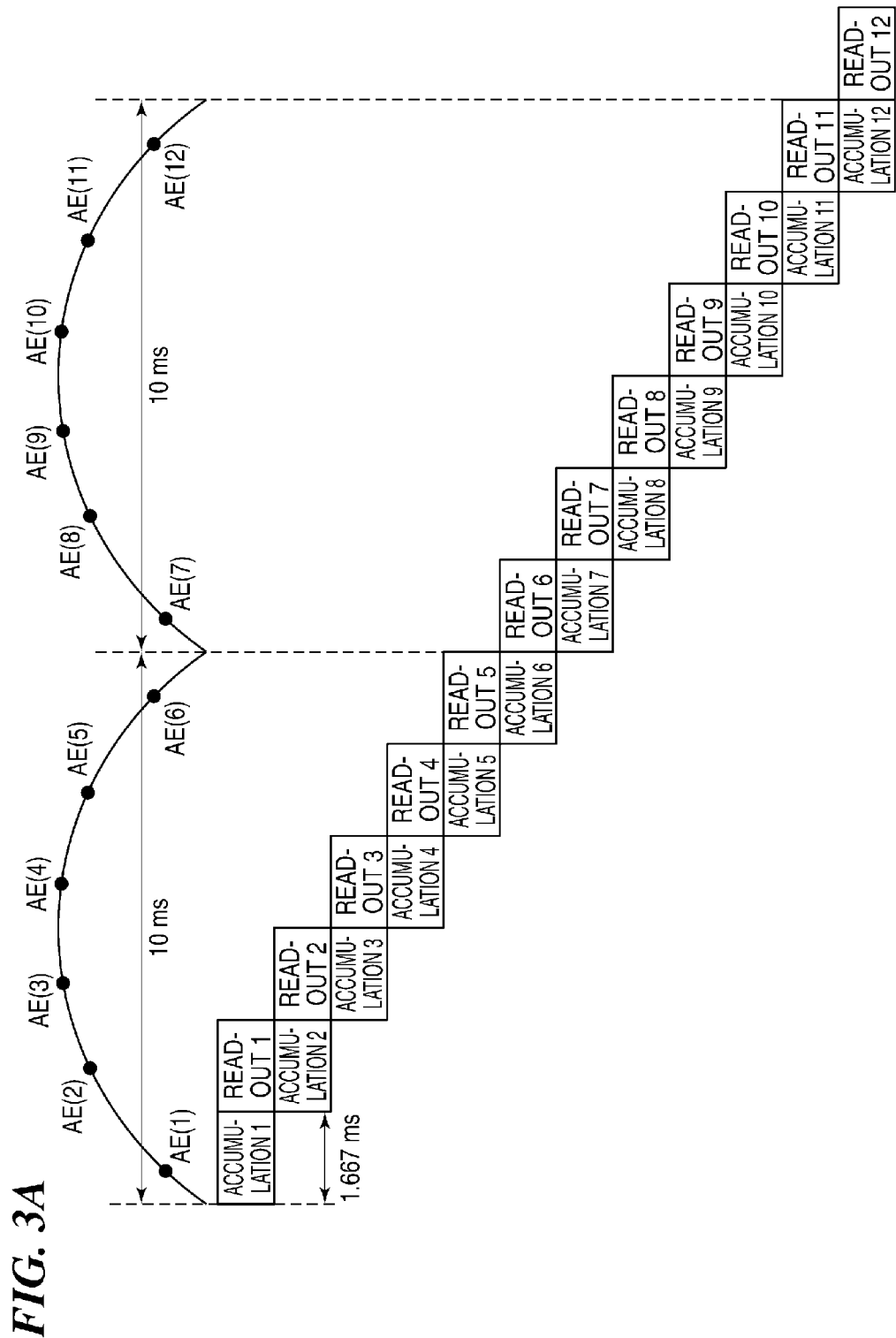
FIG. 3A is a diagram showing changes in charge accumulation, readout, and photometric values, which is useful in explaining flicker detection with respect to a flickering light source lit by a power supply with a frequency of 50 Hz.
Figure 3B:
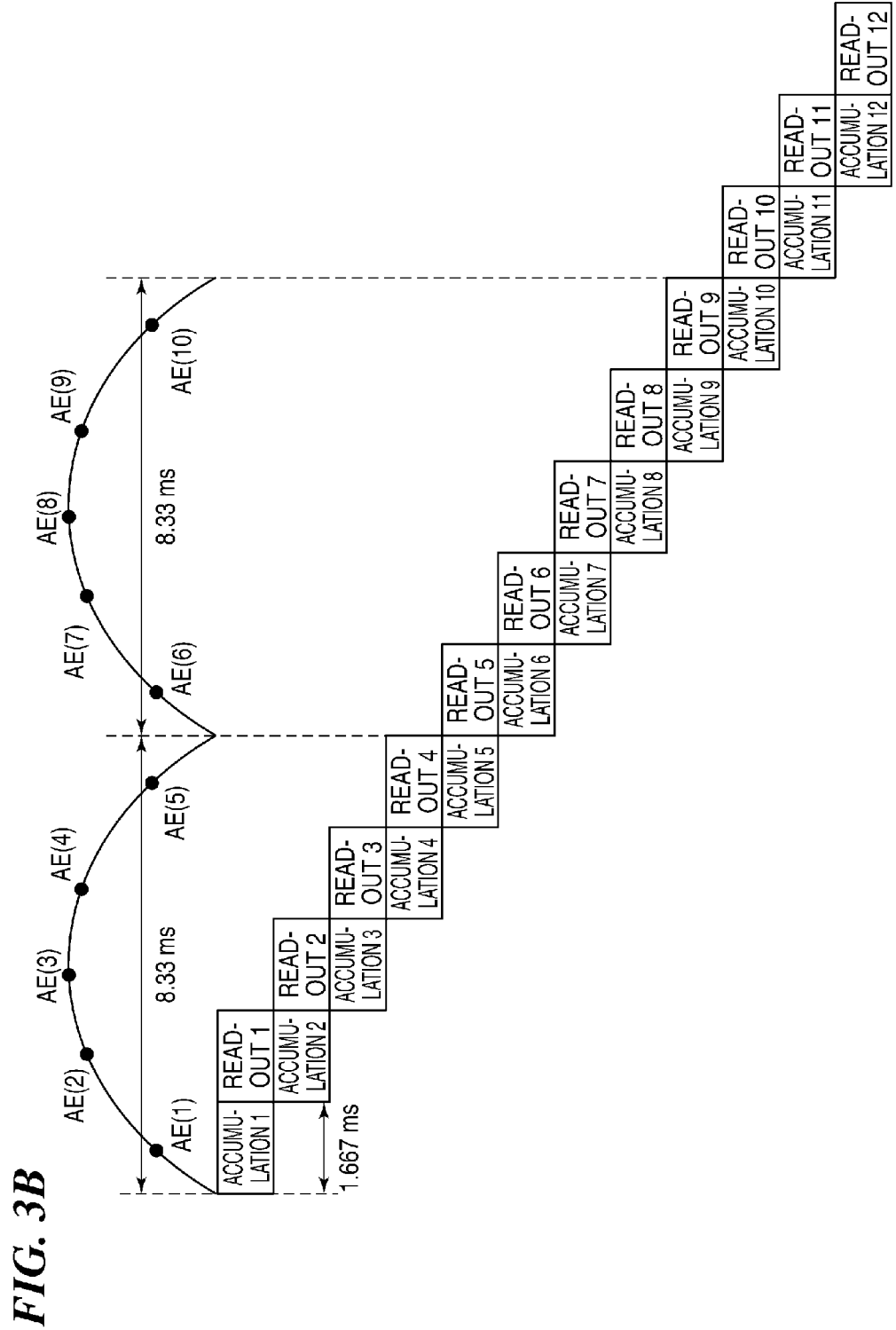
FIG. 3B is a diagram showing changes in charge accumulation, readout, and photometric values, which is useful in explaining flicker detection with respect to a flickering light source lit by a power supply with a frequency of 60 Hz.

FIGS. 3A and 3B are diagrams each showing changes in accumulation and readout for flicker detection with respect to respective light sources (flickering light sources) lit by power supplies with respective frequencies of 50 Hz and 60 Hz, and output photometric values. In flicker detection, first, accumulation and readout are periodically performed with respect to light from a photometric target by the photometric sensor 108 at fixed time intervals to thereby acquire a plurality of photometric values. More specifically, as expected flicker frequencies, it is possible to envisage frequencies of 100 Hz (first frequency) and 120 Hz (second frequency), corresponding to 50 Hz and 60 Hz which are frequencies of respective commercial power supplies. Therefore, as shown in FIGS. 3A and 3B, charge accumulation and readout are continuously performed twelve times at a period of approximately 600 fps (=approximately 1.667 ms). This period of 600 fps is a common multiple of the expected frequencies (100 Hz and 120 Hz) of flickering light sources. Therefore, the charge accumulation time period of image pickup for obtaining sequential image data in the flicker detection is shorter than $\frac{1}{120}$ sec which is the shorter one of light amount change periods of flickering light sources, corresponding to the expected flickering frequencies, respectively.

In a case where a flickering light source lit by a power supply with a frequency of 50 Hz (flicker frequency is 100 Hz) exists (hereinafter referred to as the "100 Hz flickering environment"), photometric values AE(1) to AE(12) are obtained for two periods of change in the light amount of the flickering light source. Further, in a case where a flickering light source lit by a power supply with a frequency of 60 Hz (flicker frequency is 120 Hz) exists (hereinafter referred to as the "120 Hz flickering environment"), photometric values AE(1) to AE(10) are obtained for two periods of change in the light amount of the flickering light source. In each of FIGS. 3A and 3B, a n-th (n generally represents an integer, and specifically in these figures, one in a range of 1 to 12) accumulation is indicated by "accumulation n", readout of "accumulation n" is indicated by "readout n", and a photometric value obtained by a result of "readout n" is indicated by "AE(n)". Further, the photometric value AE(n) is represented by a center value in the accumulation time period.

Then, in a step S102, the CPU 101 calculates SAD(m) (m generally represents an integer) which is an evaluation value used to determine a light amount change period (or frequency) of the flickering light source by the following equation (1). Note that SAD is an abbreviation of Sum of Absolute Difference, which is one of indices representing similarity, and is used e.g. in the field of pattern matching. In the present embodiment, "m" represents an interval in terms of the number of photometric operations, from a photometric operation for obtaining an n-th photometric value AE(n) out of photometric values obtained by respective twelve photometric operations to a photometric operation for obtaining a photometric value to be subjected to calculation of similarity to the n-th photometric value AE(n). Therefore, SAD(m) is obtained by calculating similarity between the n-th photometric value AE(n) and a photometric value AE(n+m) acquired after the lapse of (1.667×m) ms.

$$SAD(m) = \sum_{n=1}^{6} |AE(n) - AE(n+m)| \quad (1)$$

As is clear from the equation (1), as the similarity is higher, the value of SAD(m) is smaller. For example, a relationship between the flickering period (10 ms) and the photometry period (1.667 ms) under the 100 Hz flickering environment is expressed by 10/1.667≅6, and hence the flickering period can be regarded as an integer multiple of a frame period. That is, under the 100 Hz flickering environment, a predetermined photometric value (AE(n) in FIG. 3A) and a photometric value (AE(n+6) in FIG. 3A) acquired at a timing shifted by 10 ms (first interval) from the predetermined photometric value are in the same phase relationship. In this case, as shown in FIG. 3A, substantially the same photometric values are obtained at a period of six photometric operations irrespective of the accumulation timing, and a relationship expressed by AE(n)≅AE(n+6) holds. With this characteristic, when SAD(6) (first evaluation value) is calculated under the 100 Hz flickering environment, SAD(6)≅0 is obtained. Therefore, in a simplified configuration, by setting a predetermined threshold value SAD_50, if SAD(6)≤SAD_50 is satisfied, it is possible to detect that the photographing environment is the 100 Hz flickering environment.

Here, in the present embodiment, to detect that the photographing environment of the digital camera 100 is the 100 Hz flickering environment with higher accuracy, SAD (3) (second evaluation value) is calculated. The value of SAD(3) indicates similarity between the predetermined photometric value and a photometric value acquired after the lapse of 1.667 ms×3=5 ms. Under the 100 Hz flickering environment, the predetermined photometric value and the photometric value acquired at a timing shifted by 5 ms (second interval) from the predetermined value are in the opposite phase relationship, and hence the value of SAD(3) is much larger than the value of SAD(6).

Based on the similar approach, under the 120 Hz flickering environment, SAD(5) (third evaluation value) and SAD(3) (fourth evaluation value) are calculated. Under the 120 Hz flickering environment, a light emission period is 8.333 ms, and hence AE(n)≅AE(n+5) holds, which results in SAD(5)≅0. That is, under the 120 Hz flickering environment, a predetermined photometric value and a photometric value acquired at a timing shifted by approximately 8.333 ms (third interval) from the predetermined value are in the same phase relationship. Note that in a simplified configuration, by setting a predetermined threshold value SAD_60, if SAD(5)≤SAD_60 is satisfied, it is possible to detect that the photographing environment is the 120 Hz flickering environment.

Here, under the 120 Hz flickering environment, a photometric value which is in a completely opposite phase relationship with the predetermined photometric value is acquired after the lapse of 4.16 ms, and hence it is ideal to determine similarity (evaluation value) of the photometric value obtained after the lapse of 4.16 ms to the predetermined photometric value. However, 4.16 ms is not an integer multiple of the frame period 1.667 ms, and hence as a value relatively close thereto, there is used a value of SAD(3) indicative of similarity between the predetermined photometric value and the photometric value acquired after the lapse of 5 ms (fourth interval), which is in a substantially opposite phase relationship with the predetermined photometric value. Under the 120 Hz flickering environment as well, SAD(3) indicates the similarity (evaluation value) between the predetermined photometric value and the photometric value which is in a relationship close to the opposite phase relationship with the predetermined photometric value, and hence the value of SAD(3) is much larger than the value of SAD(5).

Figure 4A:
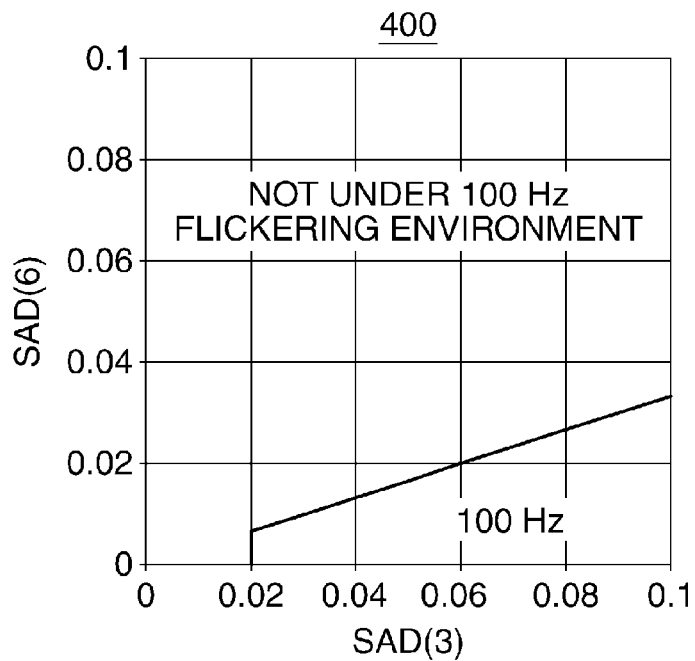
FIG. 4A is a region map used in the light amount change period determination process in FIG. 2, for determining whether or not the flicker frequency of a light source is 100 Hz.
Figure 4B:
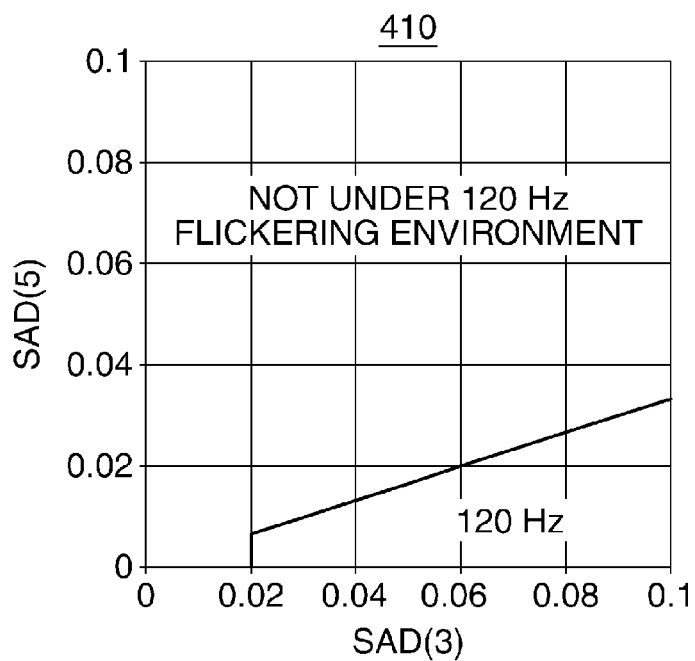
FIG. 4B is a region map used in the light amount change period determination process, for determining whether or not the flicker frequency of a light source is 120 Hz.

Thus, after calculating the values of SAD(6), SAD(5), and SAD(3) in the step S102, in a step S103, the CPU 101 performs frequency determination. The frequency determination will be described with reference to FIGS. 4A and 4B. FIGS. 4A and 4B are region maps used to perform the frequency determination based on the values of SAD(6), SAD(5), and SAD(3) in the step S103. FIG. 4A shows a region map 400 for use in determining whether or not the photographing environment is the 100 Hz flickering environment, and FIG. 4B shows a region map 410 for use in determining whether or not the photographing environment is the 120 Hz flickering environment.

As described above, SAD(3) is much larger than SAD(6) under the 100 Hz flickering environment. Therefore, on a plane with SAD(3) on the horizontal axis and SAD(6) on the vertical axis, the 100 Hz flickering environment is plotted in a relatively lower right region. Therefore, a region in which it is determined that the photographing environment is the 100 Hz flickering environment and a region in which it is determined that the photographing environment is not the 100 Hz flickering environment are set as shown in the region map 400. This makes it possible to determine whether or not the photographing environment is the 100 Hz flickering environment with high accuracy from a plotted position of a combination of the values of SAD(3) and SAD(6), in the above-mentioned plane (region map 400).

Similarly, on a plane with SAD(3) on the horizontal axis and SAD(5) on the vertical axis, the 120 Hz flickering environment is plotted in a relatively lower right region. Therefore, a region in which it is determined that the photographing environment is the 120 Hz flickering environment and a region in which it is determined that the photographing environment is not the 120 Hz flickering environment are set as shown in the region map 410. This makes it possible to determine whether or not the photographing environment is the 120 Hz flickering environment with high accuracy from a plotted position of a combination of the values of SAD(3) and SAD(5), in the above-mentioned plane (region map 410). Note that the region maps 400 and 401 are illustrated by way of example, and the positions, gradient, bending point, and so forth of each boundary dividing the regions are not limited to those of the illustrated examples.

Figures 5, 6:
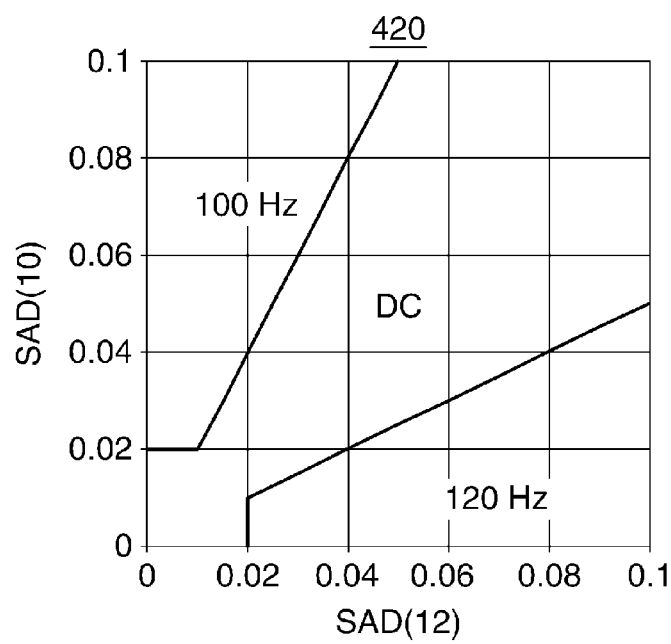
FIG. 5 is a table for determining a type of light from a photographing target.
FIG. 6 is a region map used in a variation of the light amount change period determination process, for determining the flicker frequency of a light source.

It is totally judged using the region maps 400 and 410 whether or not the photographing environment is the flickering environment, and also whether the flickering environment is the 100 Hz flickering environment or the 120 Hz flickering environment if the photographing environment is the flickering environment. FIG. 5 is a table for determining a type of light from a photographing target. In FIG. 5, "DC" indicates that the photographing environment is not the flickering environment but a photographing environment using steady light, such as sunlight.

Under the steady light environment, the photometric value does not change with time, and hence this gives AE(1)≅AE(2)≅AE(3)≅ . . . ≅AE(12). In other words, SAD(6)≅SAD(5)≅SAD(3)≅0 is obtained, and hence under the steady light environment, evaluation values (SAD) based on measured photometric values give plots in the vicinity of the origins of the associated region maps 400 and 410. Therefore, the result of determination performed with reference to FIG. 4A is that the photographing environment is not the 100 Hz flickering environment, and the result of determination performed with reference to FIG. 4B is that the photographing environment is not the 120 Hz flickering environment. This corresponds to "DC" in a lower right box of the table shown in FIG. 5.

An upper left box of the table shown in FIG. 5 indicates that it is determined that the photographing environment is the 100 Hz flickering environment and also the 120 Hz flickering environment. This result of the determination is not normally obtained, but is sometimes obtained in a case where a photographing target (object) is not the same object during acquisition of AE(1) to AE(12) due to movement of the object or a panning operation of the digital camera 100. In this case, the result of the determination is set to "DC" so as to terminate the flicker detection with error. The error termination may be notified to a user (photographer) through the optical finder. An upper right box of the table shown in FIG. 5 indicates that it is determined that the photographing environment is the 120 Hz flickering environment, and a lower left box indicates that it is determined that the photographing environment is the 100 Hz flickering environment. By thus determining the flickering period, it is possible to detect flicker with high accuracy.

Next, a description will be given of a variation of the light amount change period determination process based on the above-described flickering determination method. In this variation, the details of the respective processing steps of the flowchart in FIG. 2 are modified, but the flow of the steps are the same as in the flowchart of FIG. 2. Therefore, in the following description, each processing step will be described using the flowchart in FIG. 2.

In the step S101, the CPU 101 controls the photometric sensor 108 to perform accumulation and readout for flicker detection at a fixed period. In this step, accumulation and readout are performed eighteen times at a period of 1.667 ms (600 fps) to thereby acquire AE(1) to AE(18).

Then, in the step S102, the CPU 101 calculates only two values of SAD(12) and SAD(10). Then, in the step S103, the CPU 101 determines the type of light (light amount change period) from a photographing target based on the values of SAD(12) and SAD(10). Here, SAD(12) is a value indicative of similarity between a predetermined photometric and a photometric value acquired after the lapse of 20 ms (=1.667 ms×12). Therefore, under the 100 Hz flickering environment having a flickering period of 10 ms, SAD(12)≅0 is obtained since the photometric values acquired at an interval of 20 ms are in the same phase relationship. On the other hand, under the 120 Hz flickering environment having a flickering period of 8.33 ms, the lapse of 20 ms corresponds to a shift by 144 degrees in phase, and hence the photometric values acquired at an interval of 20 ms are in a relationship close to the opposite phase relationship. Therefore, the value of SAD (12) becomes a relatively large value. As described above, the value of SAD(12) takes a small value under the 100 Hz flickering environment, and a large value under the 120 Hz flickering environment.

Similarly, SAD(10) is a value indicative of similarity between a predetermined photometric value and a photometric value acquired after the lapse of 16.67 ms (=1.667 ms×10). Therefore, under the 120 Hz flickering environment having a flickering period of 8.33 ms, the photometric values acquired at an interval of 16.67 ms are in the same phase relationship, and hence SAD(10)≅0 is obtained. On the other hand, under the 100 Hz flickering environment having a flickering period of 10 ms, the lapse of 16.67 ms corresponds to a shift by 120 degrees in phase, and hence the value of SAD(10) becomes a relatively large value. As described above, the value of SAD(10) takes a large value under the 100 Hz flickering environment, and a small value under the 120 Hz flickering environment.

FIG. 6 is a region map 420 for use in performing the frequency determination based on the values of SAD(10) and SAD(12) in the step S103, in which the horizontal axis represents values of SAD(12) and the vertical axis represents values of SAD(10). Under the 100 Hz flickering environment, evaluation values (SAD) based on measured photometric values give a plot in an upper left region of the region map 420 in FIG. 6, and under the 120 Hz flickering environment, they give a plot in a lower right region of the same. Therefore, the regions of the 100 Hz flickering environment (indicated by "100 Hz" in FIG. 6), the 120 Hz flickering environment (indicated by "120 Hz" in FIG. 6), and DC are set as shown in FIG. 6, and the calculated values of SAD(10) and SAD(12) are checked with the region map 420. As a result, the CPU 101 can determine (calculate) the light amount change period of light from a photometric target (photographing target) with high accuracy.

Figure 7:
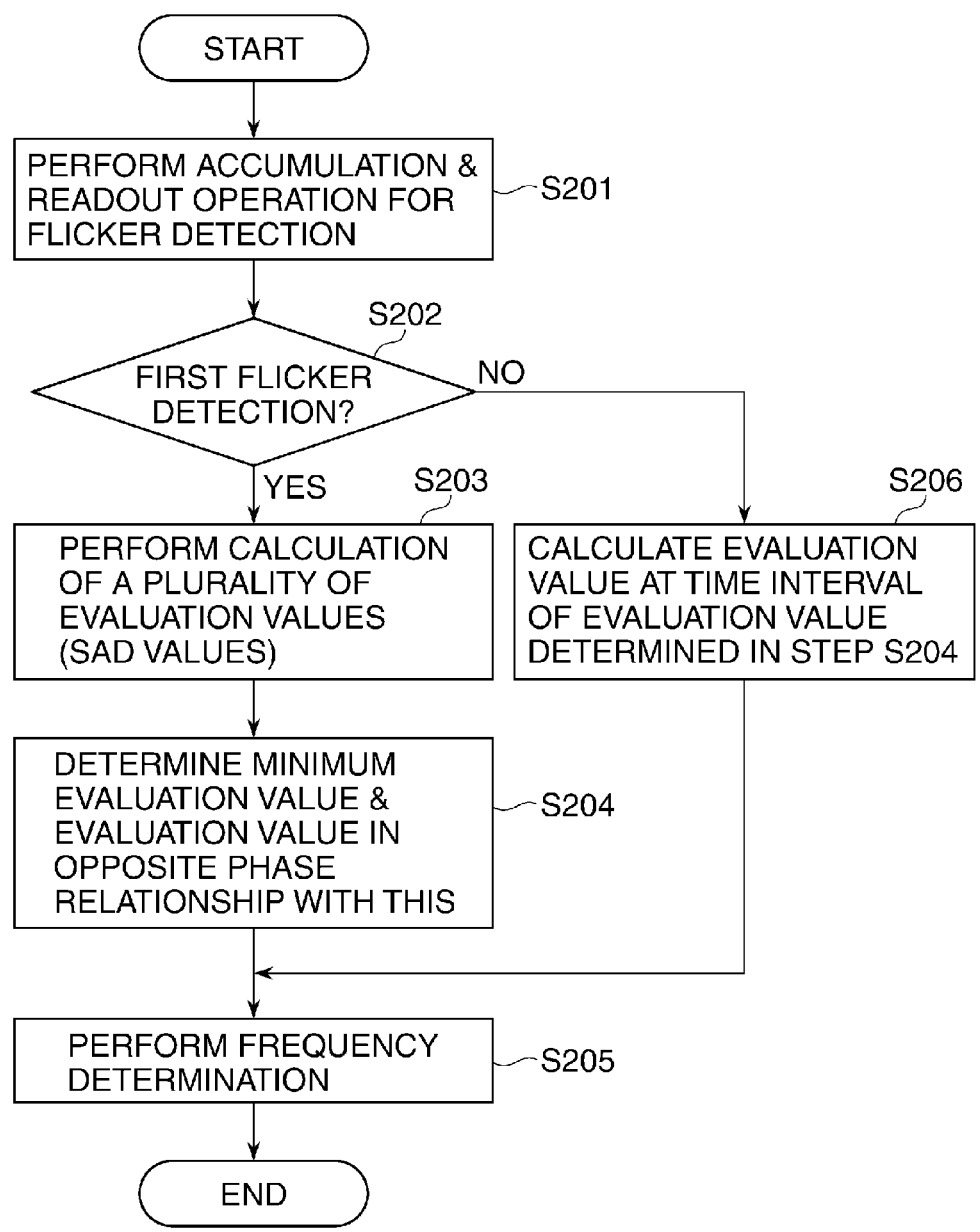
FIG. 7 is a flowchart of a light amount change period determination process performed by the digital camera based on a flicker determination method according to a second embodiment of the present invention.

FIG. 7 is a flowchart of a light amount change period determination process performed by the digital camera 100 based on a flicker determination method according to a second embodiment. The processing steps in FIG. 7 are realized by the CPU 101 that controls the operations of the components of the digital camera 100 by loading programs stored in the ROM of the memory 102 into the RAM and executing the same.

In a step S201, the CPU 101 controls the photometric sensor 108 to perform accumulation and readout for flicker detection. In this step, accumulation and readout are continuously performed twenty-four times at a period of approximately 1.667 ms (600 fps) to thereby acquire AE(1) to AE(24). In the following step S202, the CPU 101 determines whether or not the flicker detection operation is the first flicker detection operation after powering on the digital camera 100. If the flicker detection operation is the first flicker detection operation (YES to the step S202), the CPU 101 proceeds to a step S203, whereas if the flicker detection operation is not the first flicker detection operation (NO to the step S202), the CPU 101 proceeds to a step S206.

Figure 8:
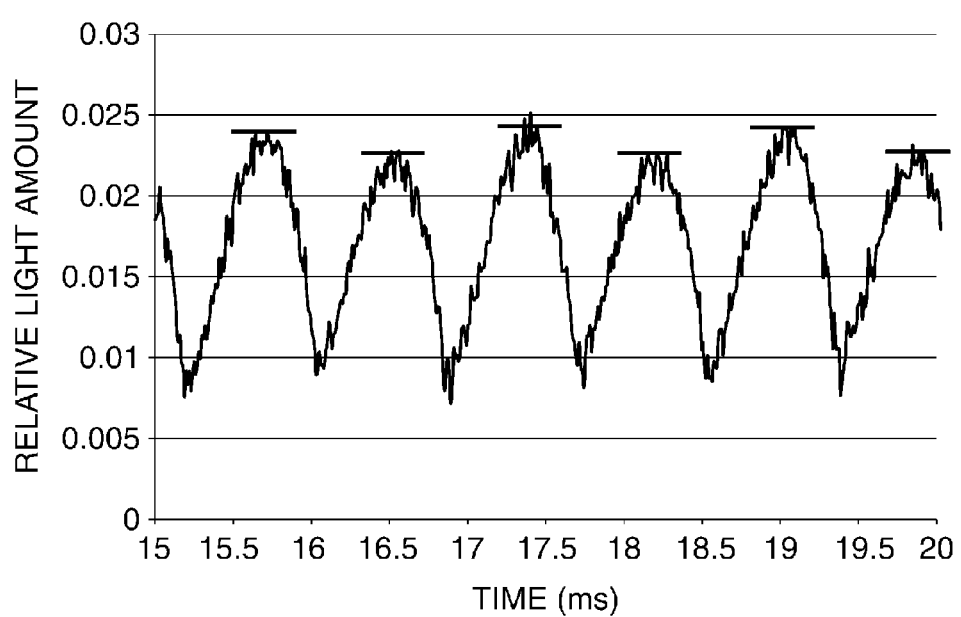
FIG. 8 is a diagram showing an example of an actually observed waveform indicative of changes in the light amount of light from a photographing target.

In the step S203, the CPU 101 calculates a plurality of evaluation values (SAD(m)). More specifically, the CPU 101 calculates seven values of SAD(5), SAD(10), SAD(15), SAD(6), SAD(12), SAD(18), and SAD(3). The reason for calculating these values will be described with reference to FIG. 8. FIG. 8 is a diagram showing an example of a waveform indicative of changes in the light amount of light from a photographing target, which has been actually observed under the 120 Hz flickering environment. In FIG. 8, the horizontal axis represents values of time elapsed (ms), and the vertical axis represents values of a ratio of a light amount to a predetermined light amount (relative light amount).

In this case, the values of SAD(5), SAD(10), and SAD(15) acquired in a manner associated with a period of a frequency of 120 Hz are all expected to take a small value close to 0. However, when focusing on the amplitude of changes in the light amount, it is known that a large crest of amplitude and a small crest of amplitude alternately appear.

Therefore, the value of SAD(10) for determining similarity between a predetermined photometric value and a photometric value acquired after the lapse of two periods (16.67 ms) is a value relatively closer to 0 than the values of SAD(5) and SAD(15). From this, it is considered that SAD(10) is the most appropriate value as a parameter for determining whether or not the photographing environment is the 120 Hz flickering environment.

On the other hand, in a case where the waveform indicative of changes in the light amount is a waveform that changes in such a manner that every third crest has the same amplitude, among the values of SAD(5), SAD(10), and SAD(15), the value of SAD(15) is a value closest to 0. Therefore, in this case, SAD(15) is the most appropriate value as the parameter for determining whether or not the photographing environment is the 120 Hz flickering environment. As described above, the three types of evaluation values (SAD(5), SAD(10), and SAD(15)) are calculated, and the most appropriate evaluation value (the minimum evaluation value) is selected, whereby it is possible to perform determination of the flickering environment with higher accuracy, for changes in the light amount, which have a feature shown in FIG. 8.

Similarly, to determine whether or not the photographing environment is the 100 Hz flickering environment, SAD(6), SAD(12), and SAD(18) are calculated. If the waveform indicative of changes in the light amount is a waveform of a frequency of 100 Hz in which a large crest of amplitude and a small crest of amplitude alternately appear, similar to one shown in FIG. 8, among the values of SAD(6), SAD(12), and SAD(18), the value of SAD(12) is a value closest to 0.

Further, similar to the first embodiment, SAD(3) is calculated which indicates similarity between a predetermined photometric value and a photometric value which is in a relationship close to the opposite phase relationship with the predetermined photometric value, under both of the 100 Hz flickering environment and the 120 Hz flickering environment. Here, only the values up to AE(24) have been acquired in the step S201, and hence only the values up to SAD(18) can be calculated. However, by increasing the number of times of accumulation and readout for flicker detection in the step S201 to thereby calculate, e.g. SAD(24), SAD(30), and so forth, the smallest one of the calculated values may be adopted as the parameter for determining whether or not the photographing environment is the 100 Hz flickering environment.

In a step S204 following the step S203, the CPU 101 determines the most appropriate evaluation values for flicker detection (the minimum evaluation value, and an evaluation value in an opposite phase relationship with the minimum evaluation value, i.e. an evaluation value calculated from a predetermined photometric value and a photometric value substantially in the opposite phase relationship with the predetermined photometric value) out of the evaluation values calculated in the step S203. In the present example, as described above, it is assumed that the values of SAD(10), SAD(12), and SAD(3) are selected.

Figure 9A:
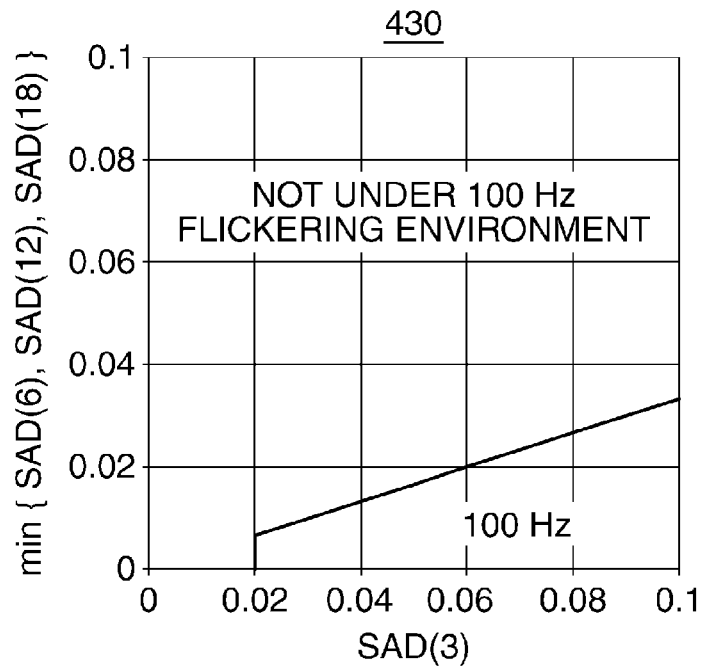
FIG. 9A is a region map used in the light amount change period determination process in FIG. 7, for determining whether or not the flicker frequency of a light source is 100 Hz.
Figure 9B:
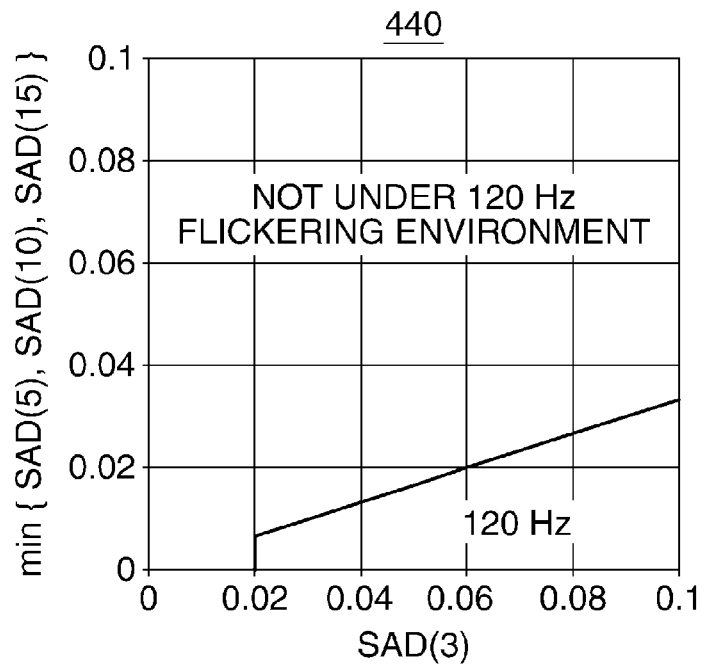
FIG. 9B is a region map used in the light amount change period determination process, for determining whether or not the flicker frequency of a light source is 120 Hz.

Then, in a step S205, the CPU 101 performs frequency determination. FIGS. 9A and 9B are region maps for use in performing the frequency determination in the step S205. A region map 430 shown in FIG. 9A is used for determining whether or not the photographing environment is the 100 Hz flickering environment, and a region map 440 shown in FIG. 9B is used for determining whether or not the photographing environment is the 120 Hz flickering environment.

In the region map 430, the horizontal axis represents values of SAD(3) and the vertical axis represents values of the minimum value of SAD(6), SAD(12), and SAD(18). Here, in the step S204 described above, it is assumed that the values of SAD(10), SAD(12), and SAD(3) are selected, and hence it is determined whether or not the photographing environment is the 100 Hz flickering environment from a plotted position of a combination of the value of SAD(3) and the value of SAD(12) in the region map 430. In the region map 440, the horizontal axis represents values of SAD(3), and the vertical axis represents values of the minimum value of SAD(5), SAD(10), and SAD(15). Here, in the step S204 described above, it is assumed that the values of SAD(10), SAD(12), and SAD(3) are selected, and hence it is determined whether or not the photographing environment is the 120 Hz flickering environment from a plotted position of a combination of the value of SAD(3) and the value of SAD(10) in the region map 440. Similar to the first embodiment, results of the determination performed with reference to the region maps 430 and 440 are combined in the table shown in FIG. 5, and the type of light from a photographing target (light amount change period) is finally determined. After the step S205, the present process is terminated.

If the flicker detection operation is not the first flicker detection operation after powering on the digital camera 100, the CPU 101 proceeds from the step S202 to the step S206. In the step S206, the CPU 101 calculates evaluation values at time intervals of the evaluation values determined in the step S204. Therefore, according to the above description, SAD(10) and SAD(12), and SAD(3) which is in the opposite phase relationship with SAD(10) and SAD(12) are calculated. These values are calculated for the following reason:

When the first flicker detection is performed under the 120 Hz flickering environment showing changes in the light amount, shown in FIG. 8, in the step S204, out of SAD(5), SAD(10), and SAD(15), SAD(10) which gives a value closest to 0 is selected as the most appropriate evaluation value. Here, the waveform of changes in the light amount, observed in the second and subsequent flicker detection operations, is expected to remain unchanged from that observed in the first flicker detection, and hence in the second and subsequent flicker detection operations, for use in determination of the 120 Hz flickering environment, only SAD(10) is calculated which indicates similarity between a predetermined photometric value and a photometric value acquired after two periods under the 120 Hz flickering environment. Similarly, as the evaluation value for use in determining whether or not the photographing environment is the 100 Hz flickering environment, SAD(12) indicative of the similarity between a predetermined photometric value and a photometric value acquired after two periods is used. Therefore, in the step S206, only SAD(10) and SAD(12), and SAD(3) which is in the opposite phase relationship therewith are calculated. This makes it possible to reduce calculation processing time. After the step S206, the process proceeds to the step S205, wherein the frequency determination is performed.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

In addition to the above-described embodiments, the digital camera 100 may be configured such that it performs image pickup, based on the flickering light amount change period determined by the CPU 101, using the image pickup device 103 at a timing close to the peak timing or the bottom timing of changes in the light amount of a flickering light source. With this configuration, it is possible to acquire image data on which the influence of flicker is reduced based on the flickering light amount change period determined with high accuracy.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

This application claims the benefit of Japanese Patent Application No. 2015-121911 filed Jun. 17, 2015, which is hereby incorporated by reference herein in its entirety.

What is claimed is:
1. An image pickup apparatus comprising:
a photometry unit;
a first calculation unit configured to calculate a first evaluation value, based on a predetermined photometric value and a photometric value at a first interval from the predetermined photometric value, out of a plurality of photometric values acquired by periodically performing photometry at fixed time intervals using said photometry unit;
a second calculation unit configured to calculate a second evaluation value, based on the predetermined photometric value and a photometric value at a second interval from the predetermined photometric value, out of the plurality of photometric values; and
a determination unit configured to determine a light amount change period of light from a photometric target, based on the first evaluation value and the second evaluation value;
wherein said determination unit determines whether or not the light from the photometric target changes at a light amount change period corresponding to a first frequency,
wherein the first interval is an interval which causes the photometric value at the first interval to be in the same phase relationship with the predetermined photometric value in a case where the light from the photometric target changes at the first frequency, and wherein the second interval is an interval which causes the photometric value at the second interval to be in an opposite phase relationship with the predetermined photometric value in a case where the light from the photometric target changes at the first frequency.

2. The image pickup apparatus according to claim 1, wherein the first interval is an integer multiple of the light amount change period corresponding to the first frequency.

3. The image pickup apparatus according to claim 1, further comprising a third calculation unit configured to calculate a third evaluation value, based on the predetermined photometric value and a photometric value at a third interval from the predetermined photometric value, out of the plurality of photometric values, and wherein said determination unit determines, based on the second evaluation value and the third evaluation value, whether or not the light from the photometric target changes at a light amount change period corresponding to a second frequency which is different from the first frequency, and wherein the third interval is an interval which causes the photometric value at the third interval to be in the same phase relationship with the predetermined photometric value in a case where the light from the photometric target changes at the second frequency.

4. The image pickup apparatus according to claim 3, wherein the third interval is an integer multiple of the light amount change period corresponding to the second frequency, and wherein the second interval is an interval which causes the photometric value at the second interval to be in the opposite phase relationship with the predetermined photometric value in a case where the light from the photometric target changes at the second frequency.

5. The image pickup apparatus according to claim 3, wherein in a case where it is determined that the light from the photometric target changes at both of the light amount change period corresponding to the first frequency and the light amount change period corresponding to the second frequency, said determination unit determines that the light from the photometric target changes neither at the light amount change period corresponding to the first frequency nor at the light amount change period corresponding to the second frequency.

6. The image pickup apparatus according to claim 1, wherein the first interval is an interval which causes the photometric value at the first interval to be in the opposite phase relationship with the predetermined photometric value in a case where the light from the photometric target changes at the second frequency which is different from the first frequency, wherein the second interval is an interval which causes the photometric value at the second interval to be in the same phase relationship with the predetermined photometric value in a case where the light from the photometric target changes at the second frequency, and causes the photometric value at the second interval to be in the same phase relationship with the predetermined photometric value in a case where the light from the photometric target changes at the first frequency, and wherein said determination unit determines whether the light from the photometric target changes at the light amount change period corresponding to the first frequency or changes at a light amount change period corresponding to the second frequency.

7. The image pickup apparatus according to claim 1, further comprising:

an image pickup unit; and an image pickup control unit configured to control photographing, based on a result of determination performed by said determination unit, such that the photographing using said image pickup unit is performed at a timing close to a peak of changes during the light amount change period corresponding to the first frequency.

8. The image pickup apparatus according to claim 1, wherein the first evaluation value and the second evaluation value are SAD values, wherein said first calculation unit calculates the plurality of first evaluation values at intervals of a predetermined integer multiple of the light amount change period corresponding to the first frequency, and wherein said determination unit determines, based on an evaluation value which is the minimum value of the plurality of first evaluation values, and the second evaluation value, whether or not the light from the photometric target unit changes at the light amount change period corresponding to the first frequency.

9. The image pickup apparatus according to claim 8, wherein said first calculation unit calculates only an evaluation value which is the minimum value of the plurality of first evaluation values, and the second evaluation value, after determination by said determination unit is performed for the first time after the image pickup apparatus is powered on.

10. The image pickup apparatus according to claim 8, further comprising a third calculation unit configured to calculate a plurality of third evaluation values, based on a predetermined photometric value and a photometric value at an interval of an integer multiple of a light amount change period corresponding to a second frequency which is different from the first frequency from the predetermined photometric value, out of the plurality of photometric values, and wherein said determination unit determines, based on an evaluation value which is the minimum value of the plurality of third evaluation values, and the second evaluation value, whether or not the light from the photometric target changes at the light amount change period corresponding to the second frequency, and wherein the third evaluation values are SAD values.

11. The image pickup apparatus according to claim 10, wherein said second calculation unit calculates only an evaluation value which is the minimum value of the plurality of third evaluation values, and the second evaluation value, after determination by said determination unit is performed for the first time after the image pickup apparatus is powered on.

12. An image pickup apparatus comprising:

a photometry unit configured to acquire a plurality of photometric values by periodically performing photometry at fixed time intervals;

a first calculation unit configured to calculate a first evaluation value, based on a predetermined photometric value and a photometric value at a first interval from the predetermined photometric value, out of the plurality of photometric values;

a second calculation unit configured to calculate a second evaluation value, based on the predetermined photometric value and a photometric value at a second interval from the predetermined photometric value, out of the plurality of photometric values;

a third calculation unit configured to calculate a third evaluation value, based on the predetermined photometric value and a photometric value at a third interval from the predetermined photometric value, out of the plurality of photometric values; and a determination unit configured to determine, based on the first evaluation value, the second evaluation value, and the third evaluation value, a period at which light from a photometric target on which photometry is performed by said photometry unit changes, wherein said determination unit determines whether the light from the photometric target changes at a light amount change period corresponding to a first frequency or at a light amount change period corresponding to a second frequency which is different from the first frequency.

13. The image pickup apparatus according to claim 12, wherein the first interval first interval is an interval which causes the photometric value at the first interval to be in the same phase relationship with the predetermined photometric value, or an interval close thereto, in a case where the light from the photometric target changes at the first frequency, wherein the third interval is an interval which causes the photometric value at the third interval to be in the same phase relationship with the predetermined photometric value, or an interval close thereto, in a case where the light from the photometric target changes at the second frequency, and wherein the second interval is an interval which causes the photometric value at the second interval to be in the opposite phase relationship with the predetermined photometric value, or an interval close thereto, in a case where the light from the photometric target changes at the first frequency or the second frequency.

14. A method of determining a light amount change characteristic at the time of photographing performed by an image pickup apparatus including a photometry unit, comprising:

acquiring a plurality of photometric values by periodically performing photometry at fixed time intervals using the photometry unit;

calculating a first evaluation value, based on a predetermined photometric value, and a photometric value at a first interval which causes the photometric value at the first interval to be in the same phase relationship with the predetermined photometric value in a case where light from a photometric target changes at a first frequency, out of the plurality of photometric values;

calculating a second evaluation value, based on the predetermined photometric value, and a photometric value at a second interval which causes the photometric value at the second interval to be in an opposite phase relationship with the predetermined photometric value in a case where the light from the photometric target changes at the first frequency; and determining a light amount change period of the light from the photometric target, based on the first evaluation value and the second evaluation value, to thereby determine whether or not the light from the photometric target changes at a light amount change period corresponding to the first frequency.

15. A method of determining a light amount change characteristic at the time of photographing performed by an image pickup apparatus including a photometry unit, comprising:

acquiring a plurality of photometric values by periodically performing photometry at fixed time intervals;

calculating a first evaluation value, based on a predetermined photometric value and a photometric value at a first interval from the predetermined photometric value, out of the plurality of photometric values;

calculating a second evaluation value, based on the predetermined photometric value and a photometric value at a second interval from the predetermined photometric value, out of the plurality of photometric values;

calculating a third evaluation value, based on the predetermined photometric value and a photometric value at a third interval from the predetermined photometric value, out of the plurality of photometric values; and determining, based on the first evaluation value, the second evaluation value, and the third evaluation value, a period at which light from a photometric target on which photometry is performed by the photometry unit changes, to thereby determine whether the light from the photometric target changes at a light amount change period corresponding to a first frequency or at a light amount change period corresponding to a second frequency which is different from the first frequency.

16. A non-transitory computer-readable storage medium storing a computer-executable program for causing a computer to execute a method of determining a light amount change characteristic at the time of photographing performed by an image pickup apparatus including a photometry unit, wherein the method comprises:

acquiring a plurality of photometric values by periodically performing photometry at fixed time intervals using the photometry unit;

calculating a first evaluation value, based on a predetermined photometric value, and a photometric value at a first interval which causes the photometric value at the first interval to be in the same phase relationship with the predetermined photometric value in a case where light from a photometric target changes at a first frequency, out of the plurality of photometric values;

calculating a second evaluation value, based on the predetermined photometric value, and a photometric value at a second interval which causes the photometric value at the second interval to be in an opposite phase relationship with the predetermined photometric value in a case where the light from the photometric target changes at the first frequency; and determining a light amount change period of the light from the photometric target, based on the first evaluation value and the second evaluation value, to thereby determine whether or not the light from the photometric target changes at a light amount change period corresponding to the first frequency.

17. A non-transitory computer-readable storage medium storing a computer-executable program for causing a computer to execute a method of determining a light amount change characteristic at the time of photographing performed by an image pickup apparatus including a photometry unit, wherein the method comprises:

acquiring a plurality of photometric values by periodically performing photometry at fixed time intervals;

calculating a first evaluation value, based on a predetermined photometric value and a photometric value at a first interval from the predetermined photometric value, out of the plurality of photometric values;

calculating a second evaluation value, based on the predetermined photometric value and a photometric value at a second interval from the predetermined photometric value, out of the plurality of photometric values;

calculating a third evaluation value, based on the predetermined photometric value and a photometric value at a third interval from the predetermined photometric value, out of the plurality of photometric values; and determining, based on the first evaluation value, the second evaluation value, and the third evaluation value, a period at which light from a photometric target on which photometry is performed by the photometry unit changes, to thereby determine whether the light from the photometric target changes at a light amount change period corresponding to a first frequency or at a light amount change period corresponding to a second frequency which is different from the first frequency.

* * * * *